(No Model.)

T. SAULT.
PHOTOGRAPHIC FILM.

No. 494,306. Patented Mar. 28, 1893.

Witnesses:—
D. N. Hayward
C. E. Sundgren

Inventor:—
Thomas Sault
by attorneys
Brown & Seward

UNITED STATES PATENT OFFICE.

THOMAS SAULT, OF NEW HAVEN, CONNECTICUT.

PHOTOGRAPHIC FILM.

SPECIFICATION forming part of Letters Patent No. 494,806, dated March 28, 1893.

Application filed September 3, 1892. Serial No. 444,942. (No specimens.)

*To all whom it may concern:*

Be it known that I, THOMAS SAULT, of New Haven, in the county of New Haven and State of Connecticut, have invented a new and useful Improvement in Films for Photographic Cameras, of which the following is a specification.

My invention relates to an improvement in films for photographic cameras in which provision is made for separating the films when packed in successive layers within the holder, so that a film-transferring device may be slid between two successive films or may readily catch the edge of the film for the purpose of removing the films successively from one section to another of the holder.

Figure 1:
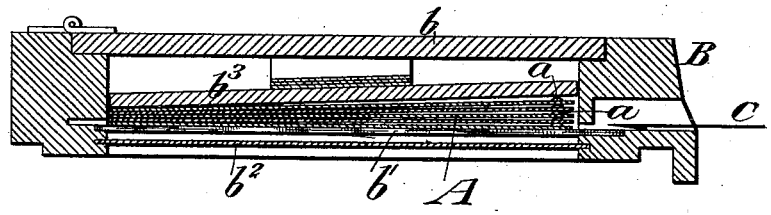
Figure 2:
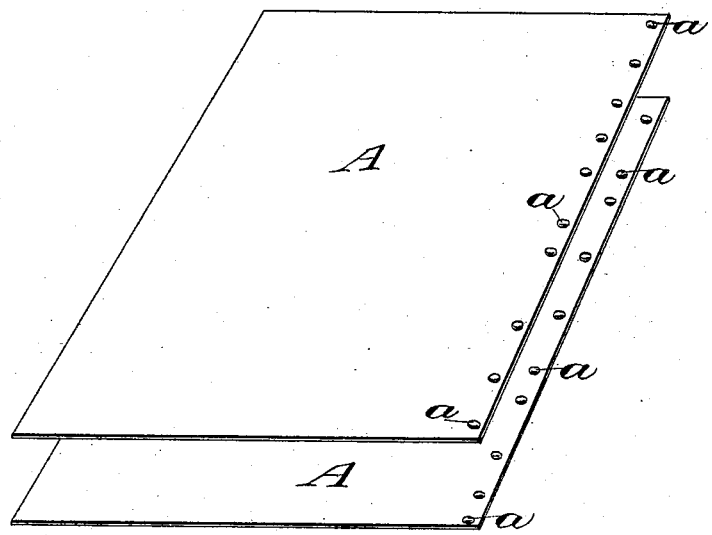
Figure 3:

A practical embodiment of my invention is represented in the accompanying drawings in which Figure 1 is a partial view in section of a film-holder, showing several of the improved films therein and a transferring device in position to enter between the films to remove one of them to another part of the holder. Fig. 2 is a view of two of the films separated from each other and showing the spacing device along their edges, and Fig. 3 is an enlarged view in detail and in transverse section of a part of one of the films, the section being taken through one of the spacing devices.

I have chosen, to illustrate the practical use of my present invention, a film holder of the character shown, described and claimed in Letters Patent granted to me June 21, 1892, and numbered 477,337, and have shown such a part of the holder as will be sufficient to clearly indicate the effect of the spacing devices along the edge of the films as a means for permitting the transferring device to enter freely between each two successive films or to readily catch the edge of a film for purposes of transferring them.

The films are represented by A and are provided along one of their edges with projections $a$. The number of projections may be determined at pleasure, the object being to have them at such intervals apart as will serve to hold the edge of the film above from any considerable amount of sagging. The projections $a$ may be conveniently formed by pressing the material of the film itself out from the face of the film by means of a round pointed punch, or any well known or suitable device adapted to the purpose. It is desirable that the sides of the projections $a$ toward the edge of the film where the transferring device is to enter between the films, should be made sufficiently slanting to permit the end or edge of said transferring device to slide over the projection without tending to buckle the film. In making the projections $a$, the order in which they are made is slightly varied in each succeeding sheet so that a sufficient number of the projections will fall out of alignment to hold the edges effectively separated.

The particular shape of the projections $a$ is immaterial with the exception herein before noted that the side toward the transferring device be so formed as to permit the said device to slide readily over it.

The holder as represented in Fig. 1 is denoted by B, its door by $b$, the transparent plate in front of the films by $b'$, the slide by $b^2$ and the follower by $b^3$. The transferring device, or so much of it as is herein shown, is represented by C and is in the position which it assumes when it is about to be advanced between the films against the transparent plate $b'$ and the next succeeding film to the rear.

While I have shown the films in connection with the particular holder and transferring device shown and described in my former patent referred to, I do not wish to be understood as limiting their use to that particular holder.

What I claim is—

A film for a photographic camera having its surface raised along its edge to form a spacing for the admission of a transferring device between the edges of two consecutive plates, substantially as set forth.

THOMAS SAULT.

Witnesses:
 DAVID A. POST,
 JOHN G. CHAPMAN.